United States Patent
Rosenberg et al.

(10) Patent No.: US 7,767,190 B2
(45) Date of Patent: *Aug. 3, 2010

(54) INHIBITING THE FORMATION OF TCA IN A BAYER CAUSTICISATION PROCESS

(75) Inventors: Steven Philip Rosenberg, Australind (AU); Darrel James Wilson, Australind (AU); Catherine Ann Heath, East Bunbury (AU)

(73) Assignee: BHP Billiton Worsley Alumina PTY Ltd., Collie (AU)

( * ) Notice: Subject to any disclaimer, the term of this patent is extended or adjusted under 35 U.S.C. 154(b) by 351 days.

This patent is subject to a terminal disclaimer.

(21) Appl. No.: 10/281,190

(22) Filed: Oct. 28, 2002

(65) Prior Publication Data

US 2003/0129125 A1  Jul. 10, 2003

Related U.S. Application Data (62) Division of application No. 09/787,943, filed as application No. PCT/AU99/00757 on Sep. 13, 1999, now Pat. No. 6,676,910.

(30) Foreign Application Priority Data

Sep. 25, 1998 (AU) .................... PP6224
Aug. 26, 1999 (AU) .................... PQ2476

(51) Int. Cl.
*C01F 7/00* (2006.01)
(52) U.S. Cl. ............... 423/600; 423/115; 423/127; 423/629; 106/692
(58) Field of Classification Search ........ 423/600, 423/127, 115, 629, 121; 106/692, 695, 696; 50/125

See application file for complete search history.

(56) References Cited

U.S. PATENT DOCUMENTS 2,345,134 A * 3/1944 Lindsay et al. ......... 423/265

(Continued)

FOREIGN PATENT DOCUMENTS

EP  0 286 034 B1  3/1991

(Continued)

OTHER PUBLICATIONS

Perrotta et al. "Layered Double Hydroxides for Treatment of Bayer Process Lake Water". Light Metals, 1997.*

*Primary Examiner*—Stanley Silverman
*Assistant Examiner*—Paul Wartalowicz
(74) *Attorney, Agent, or Firm*—Edell, Shapiro & Finnan, LLC (57) ABSTRACT

An improved process for the causticisation of Bayer liquors in an alumina refinery, the process including the steps of reacting lime with aluminate ions in a Bayer liquor within a primary reactor under controlled conditions of low to moderate temperature (between 70-80° C.) and agitation, to form substantially only a hydrocalumite species and hydroxyl ions; and a secondary reactor wherein the hydrocalumite species formed is subjected to heating in contact with a Bayer liquor under controlled conditions so as to cause the hydrocalumite species to react with the liquor to form calcium carbonate, aluminate ions and hydroxyl ions, whereby a causticised Bayer liquor is obtained and wherein the efficiency of lime utilization is substantially increased and/or alumina losses are minimized.

25 Claims, 3 Drawing Sheets

U.S. PATENT DOCUMENTS

| | | |
|---|---|---|
| 2,519,362 A | 8/1950 | Flint et al. |
| 2,992,893 A | 7/1961 | Soudan et al. |
| 3,120,996 A | 2/1964 | Porter |
| 3,210,155 A | 10/1965 | Cagnolatti et al. |
| 4,059,672 A * | 11/1977 | Davis et al. ................. 423/121 |
| 4,157,382 A * | 6/1979 | Goodboy et al. ............ 423/628 |
| 4,210,455 A * | 7/1980 | Metcalf et al. .............. 106/727 |
| 4,275,042 A * | 6/1981 | Lever ........................ 423/130 |
| 4,302,251 A * | 11/1981 | Udagawa et al. ............ 106/708 |
| 4,335,082 A | 6/1982 | Matyasi et al. |
| 4,478,795 A * | 10/1984 | Hereda et al. ............... 423/127 |
| 4,486,393 A | 12/1984 | Baksa et al. |
| 4,597,952 A * | 7/1986 | Fabre et al. ................. 423/122 |
| 4,609,534 A | 9/1986 | The et al. |
| 4,670,055 A * | 6/1987 | Koslowski ................. 106/677 |
| 4,767,540 A * | 8/1988 | Spitzer et al. .............. 210/728 |
| 5,122,349 A * | 6/1992 | Banvolgyi et al. ........... 423/124 |
| 5,273,579 A * | 12/1993 | Tanaka et al. ............... 106/715 |
| 5,346,511 A * | 9/1994 | Dimas ...................... 23/293 R |
| 5,387,405 A * | 2/1995 | Connelly et al. ............ 423/122 |
| 5,437,720 A * | 8/1995 | Cox et al. ................... 106/415 |
| 5,488,991 A * | 2/1996 | Cowan et al. ............... 166/293 |
| 5,853,677 A * | 12/1998 | Avotins et al. .............. 423/121 |
| 5,869,020 A * | 2/1999 | Rijkeboer et al. ........... 423/629 |
| 6,676,910 B1 * | 1/2004 | Rosenberg et al. .......... 423/115 |

FOREIGN PATENT DOCUMENTS

| | | |
|---|---|---|
| EP | 0 465 055 B1 | 4/1997 |
| GB | 1045545 | 10/1966 |
| HU | 207826 B | 6/1993 |
| HU | 212 533 B | 7/1996 |

* cited by examiner

INHIBITING THE FORMATION OF TCA IN A BAYER CAUSTICISATION PROCESS

CROSS REFERENCE TO RELATED APPLICATIONS

This application is a divisional of U.S. patent application Ser. No. 09/787,943, entitled "Improved Bayer Causticisation" and filed on Mar. 23, 2001 now U.S. Pat. No. 6,676,910, which is a national stage application of International Application PCT/AU99/00757, filed Sep. 13, 1999, entitled "Improved Bayer Causticisation". The disclosures of the above-identified patent applications are incorporated herein by reference in their entireties.

FIELD OF THE INVENTION

The present invention relates to an improved process and apparatus for the causticisation of Bayer liquors in an alumina refinery and relates particularly, though not exclusively, to a process in which the achievable C/S ratio is significantly increased and/or in which substantially improved lime utilisation efficiencies and/or reduced alumina losses can be achieved.

BACKGROUND OF THE INVENTION

In the Bayer process for alumina production, a concentrated sodium aluminate solution is produced by grinding and digesting bauxite in a caustic solution, usually under conditions of elevated temperature and pressure. After clarification of the slurry, the concentrated sodium aluminate solution is cooled and seeded with gibbsite crystals, causing gibbsite to crystallise from solution. The gibbsite is calcined to produce alumina, while the depleted (or "spent") liquor is recycled to digest more bauxite.

During digestion, some of the caustic is consumed in undesirable reactions with impurities within the bauxite, reducing the liquor's productivity. One of the most significant of these reactions results in the formation of sodium carbonate, arising from the dissolution of inorganic carbonates within the mineral phases present, or from the thermal and oxidative degradation reactions of organic compounds. Unless controlled, with each cycle of the liquor through the process the sodium carbonate concentration would continue to rise, with a corresponding reduction in the liquor's ability to digest gibbsite or boehmite from the bauxite.

The most common technique for controlling the sodium carbonate concentration in Bayer process liquors is to causticise using either quicklime or slaked lime. This process can be carried out either within the digestion circuit itself (by introducing lime with the bauxite), or more commonly, as a side-stream process. The addition of lime directly with bauxite is not common except where lime is required to control other impurities (such as titanium or phosphorus), because the very concentrated liquors contribute to poor efficiency. Unless the temperature is very high, most of the lime undergoes side-reactions with the aluminate in solution to yield calcium aluminate species, particularly tricalcium aluminate (TCA, often also referred to as C3A in the cement industry).

In the more prevalent side-stream causticisation, a dilute liquor stream (usually taken from one of the mud washing stages) is reacted with a slaked lime slurry, generally at close to the atmospheric boiling point of the combined liquor. Alternatively, the slurry is sometimes added directly to the mud washer. The amount of sodium carbonate converted and the efficiency of lime utilisation are dependent upon many variables, but in most refineries, the lime efficiency is in the vicinity of 50 to 70%.

In the alumina industry it is common to refer to a Bayer liquor's carbonate impurity level in terms of the caustic to soda ratio, or 'C/S'. Here, 'C' refers to the sum of the concentrations of sodium aluminate and sodium hydroxide, expressed as the equivalent concentration of sodium carbonate. The 'S' concentration refers to the sum of 'C' and the actual sodium carbonate concentration, this sum once again being expressed as the equivalent concentration of sodium carbonate. It can be seen from this that a fully causticised (carbonate-free) Bayer process liquor will possess a C/S ratio of 1.00. Typically, the C/S ratio of the concentrated liquor stream in many alumina refineries is in the range 0.8 to 0.85. C/S ratios higher than this are difficult to achieve, because causticisation processes in current use are incapable of fully removing all of the sodium carbonate in the liquor streams fed to them. For example, a liquor with an S concentration of 135 g/L will typically only causticise to a C/S ratio of about 0.890. This limitation arises because the traditional implementation of the causticisation reaction with slaked lime is controlled by a number of complex equilibria, including a competing reaction involving the aluminate ion in which TCA is formed.

By contrast, the causticisation reaction of pure mixed solutions of sodium carbonate and sodium hydroxide with slaked lime is quite simple. The final concentration of hydroxide and carbonate ions is a function of the activities of the various ionic species present, in equilibrium with the solid phases calcium hydroxide and calcium carbonate. The reaction can be described by the following equation:

$$Ca(OH)_2 + Na_2CO_3 \leftrightarrows CaCO_3 + 2NaOH \quad (1)$$

It has generally been assumed that the above reaction also applies when causticisation is performed in Bayer process liquors. However, it has been known for some time that calcium hydroxide reacts readily with the aluminate ion, ostensibly to form TCA. The formation of TCA is commonly held to occur via one or both of two mechanisms: a simultaneous competitive reaction in which the calcium hydroxide reacts directly with the aluminate ion to form TCA [Chaplin, N. T., Light Metals (1971), 47-61], or a "reversion" reaction in which the calcium carbonate formed during causticisation reacts with the aluminate. However, some authors have suggested that in Bayer liquors causticisation occurs via a "hydrated tricalcium aluminate intermediate" [Young, R. C., Light Metals (1982), 97-117] or a "carboaluminate" phase [Lectard, A; Travaux ICSOBA, 12(17), (1982), 149-156] and that TCA forms as this material ages.

Irrespective of the mechanism proposed, causticisation as practised in the Bayer process has been inefficient in terms of the C/S achieved, and in the efficiency of lime use. Furthermore, poor efficiency of lime utilisation has also meant that quite considerable amounts of aluminate ions are consumed in the formation of TCA. This can represent a substantial loss of alumina production.

A number of causticisation processes have been proposed over the years aimed at improved lime efficiency. However, these processes are generally of limited value in that they are restricted to low 'S' concentration wash liquors, requiring large flows to be processed if sufficient mass of sodium carbonate is to be converted to compensate for the carbonate input to the refinery. In U.S. Pat. No. 2,992,893 a process is disclosed in which the thickened mud from a final mud washing stage was causticised, and then reacted with supplementary sodium carbonate to recover some of the alumina lost in the formation of TCA. The causticised liquor was then used in the mud washing stages. Apart from the 'S' concentration limitation, this process is not ideal in that a substantial proportion of the causticised liquor is lost with the red mud residue.

An improvement over this process is described in U.S. Pat. No. 3,120,996 in which causticisation is performed in a first stage washer, supplemented by further lime addition to a third stage washer. Higher lime efficiencies were achieved (approximately 85 to 95%), but only in quite dilute washer streams (80 g/L 'S'), and the achievable C/S ratio or the causticised liquor was not very high.

A later development disclosed in U.S. Pat. No. 3,210,155 involves the direct slaking of quicklime in a clarified wash liquor that had been heated to 100° C. After reaction, the slurry was then mixed with further wash liquor to encourage the reaction of TCA with sodium carbonate, and so recover alumina. While high C/S ratios were claimed with this process, it was restricted to wash streams with 'S' concentrations of approximately 15 to 40 g/L.

Another process was developed in Hungary in the 1980s by Baksa et al as disclosed in U.S. Pat. No. 4,486,393. In this process, a red mud slurry from one of the washing stages was heated and fed to a reaction vessel with excess lime slurry. Apart from the "normal" causticisation afforded in this tank, the excess lime reacted with sodalite and cancrinite desilication products to form a calcium hydrogarnet, releasing sodium hydroxide. The discharge from this vessel was then fed to a second vessel, and further reacted with a sodium carbonate solution. This solution was obtained by salting out sodium carbonate from concentrated solutions elsewhere in the plant. The reaction of sodium carbonate with either the hydrogarnet or "hydrated" calcium aluminate resulted in the recovery of alumina and some caustic, although this step tended to reverse the gains made by formation of the hydrogarnet species. While an improvement over the basic causticisation principle, lime and alumina losses through the formation of TCA are still substantial, and the achieved C/S is still limited by the carbonate/hydroxide equilibrium reaction. Furthermore, efficiency deteriorates badly if low 'S' concentration washer streams are not utilised.

In summary, it can be seen that the prior art causticisation methods suffer from deficiencies both in the extent to which Bayer process liquors can be causticised (i.e. the maximum C/S that can be achieved), and the efficiency with which lime is utilised to effect this causticisation. By virtue or their poor lime utilisation efficiency, these processes result in the loss of aluminate from solution, thereby reducing the alumina refinery's productivity. Further, the prior art methods are limited with respect to the concentration of the solutions that can be causticised, becoming very inefficient with liquors approaching typical first stage mud washing liquors, or mud settler overflow liquors.

SUMMARY OF THE INVENTION

The present invention was developed with a view to providing a process and apparatus for improved causticisation of Bayer liquors which is less susceptible to some of the disadvantages of the prior art noted above.

According to one aspect of the present invention there is provided an improved process for the causticisation of Bayer liquors in an alumina refinery, the process including the steps of:

reacting lime with aluminate ions in a Bayer liquor under controlled conditions of low to moderate temperature to form substantially only a hydrocalumite species and hydroxyl ions; and, heating said hydrocalumite species in contact with a Bayer liquor under controlled conditions so as to cause the hydrocalumite species to react with the liquor to form calcium carbonate, aluminate ions and hydroxyl ions, whereby a causticised Bayer liquor is obtained and wherein the efficiency of lime utilisation is substantially increased and alumina losses minimised.

Typically the first reaction involving the formation of a hydrocalumite slurry is performed at temperatures between about 25° C. and 100° C. Preferably, best performance with most Bayer liquors is obtained if the temperature is maintained between about 70° C. and 80° C. Preferably the first reaction occurs in a Bayer liquor which is subject to agitation.

Preferably the second reaction involving the heating of the hydrocalumite species is performed at temperatures between about 100° C. and 180° C. Most preferably the second reaction is performed under conditions of low shear at about 120° C.

Advantageously the process further includes the step of adding a suitable inhibitor to the Bayer liquor at a suitable point prior to heating the hydrocalumite species whereby undesirable reaction of the hydrocalumite species to form TCA is inhibited. Preferably said inhibitor is a complexing agent and/or surfactant which is capable of being adsorbed at active sites on the surface of the hydrocalumite species to restrict the diffusion of active species at these sites. Examples of suitable surfactants include sugars such as sucrose and glucose, and polysaccharides such as starch. Most preferably anionic organic surfactants are employed. Examples of anionic organic surfactants includes the following materials, their salts, and derivatives: any anionic homopolymers or copolymers (e.g. polyacrylic acid and its co-polymers with acrylamide, or polymers bearing hydroxamate functional groups), hydroxamic acids, humic and tannic acids, lignosulphonates, fatty acids, sulphonated carboxylic acids, carboxylic acids, and polyhydroxy carboxylic acids.

Advantageously the Bayer liquor employed in the first reaction involving the formation of the hydrocalumite species has been pre-causticised whereby the C/S ratio of the pre-causticised liquor can also be further increased.

Preferably the first reaction is performed in a Bayer liquor with a moderately high A/C ratio and low free caustic. A suitable liquor will typically have an "S" concentration of between 40 and 350 g/L, and an A/C ratio of between 0.2 and 0.95. More preferably the liquor will have an "S" concentration of between 120 and 160 g/L, and an A/C ratio greater than 0.55. Typical residence time required for the completion of the first reaction is between 5 and 30 minutes, in the presence of a suitable inhibitor.

Advantageously, the hydrocalumite slurry formed in the first reaction is subject to solid/liquid separation and the hydrocalumite solids reacted with a fresh liquor to be causticised via said second reaction.

According to a still further aspect of the present invention there is provided an improved process for the causticisation of Bayer liquors in an alumina refinery, the process including the steps of:

adding a suitable inhibitor to a Bayer liquor to stabilize the formation of a hydrocalumite species during causticisation to inhibit undesirable reaction of the hydrocalumite species to form TCA, whereby the attainable C/S ratio of the liquor can be increased.

Preferably said inhibitor is a complexing agent and/or surfactant which is capable of being adsorbed at active sites on the surface of the hydrocalumite species to inhibit the diffusion of active species at these sites. Examples of suitable surfactants include sugars such as sucrose and glucose, and polysaccharides such as starch. Most preferably anionic organic surfactants are employed. Examples of anionic organic surfactants includes the following materials, their salts, and derivatives: any anionic homopolymers or copolymers (e.g. polyacrylic acid and its co-polymers with acrylamide, or polymers bearing hydroxamate functional groups), hydroxamic acids, humic and tannic acids, lignosulphonates, fatty acids, sulphonated carboxylic acids, carboxylic acids, and polyhydroxy carboxylic acids.

Preferably the improved process further comprises the step of heating the liquor during causticisation to temperatures within the range 100° C. to 180° C. More preferably the liquor is heated to between 120° C. and 140° C.

According to a further aspect of the present invention there is provided an improved process for the causticisation of Bayer liquors in an alumina refinery, the process including the steps of:

obtaining a pre-causticised Bayer liquor; and, reacting lime with aluminate ions in said pre-causticised Bayer liquor under controlled conditions of low to moderate temperature to form substantially only a hydrocalumite species and hydroxyl ions whereby the C/S ratio of the pre-causticised liquor can be further increased.

According to another aspect of the present invention there is provided an apparatus for the improved causticisation of Bayer liquors in an alumina refinery, the apparatus including:

a conventional reactor for causticising a Bayer liquor; and a trim reactor for reacting lime with aluminate ions in the causticised Bayer liquor under controlled conditions of low to moderate temperature to form substantially only a hydrocalumite species and hydroxyl ions whereby the C/S ratio of the causticised liquor can be further increased.

According to a still further aspect of the present invention there is provided an apparatus for the improved causticisation of Bayer liquors in an alumina refinery, the apparatus including:

a primary reactor for reacting lime with aluminate ions in a Bayer liquor under controlled conditions of low to moderate temperature to form substantially only a hydrocalumite species and hydroxyl ions; and a secondary reactor wherein said hydrocalumite species have been subject to heating in contact with a Bayer liquor under controlled conditions so as to cause the hydrocalumite species to react with the liquor to form calcium carbonate, aluminate ions and hydroxyl ions, whereby a causticised Bayer liquor is obtained and wherein the efficiency of lime utilisation is substantially increased and/or alumina losses are minimised.

Typically said primary reactor is a stirred tank reactor in which adequate mixing of the lime and the Bayer liquor occurs to promote the first reaction.

Typically said secondary reactor is a stirred tank reactor. Alternately a pressurised tube reactor may be employed.

Preferably the apparatus further comprises means for separating the solid hydrocalumite species and the liquor from the primary reactor before reacting the hydrocalumite species in the secondary reactor with a fresh liquor.

Most preferably the liquor causticised in the secondary reactor is used as the feed liquor for the primary reactor, whereby the C/S ratio of the causticised liquor can also be substantially increased.

BRIEF DESCRIPTION OF THE DRAWINGS

In order to facilitate a more detailed understanding of the nature of the invention several embodiments of the improved causticisation process and apparatus will now be described in detail, by way of example only, with reference to the accompanying drawings, in which.

DETAILED DESCRIPTION OF PREFERRED EMBODIMENTS

The present invention is based on the discovery that the reaction of lime (either quicklime or slaked lime) in Bayer process liquors occurs via a series of sequential reactions. Surprisingly the inventors' findings indicate that the direct reaction of calcium hydroxide with the carbonate ion as described in equation (1) does not occur to any appreciable extent. More significantly, they have found that by suitable manipulation of solution compositions and conditions of temperature and agitation, it is possible to separate these reactions into distinct steps that can be individually optimised. This optimisation can increase the efficiency of lime utilisation to 95% or greater.

Most significantly, the inventors have found that it is possible to capitalise on the very different equilibria that apply in each of these steps to substantially increase the efficiency of carbonate removal. The causticisation process disclosed can be operated in such manner that it is possible to achieve C/S ratios of close to 1.00, even in quite concentrated Bayer process liquors. It is a very surprising finding of this work that the C/S ratios that can be achieved are greater even than that obtainable in pure aluminate-free sodium hydroxide/sodium carbonate solutions of equivalent concentration.

This combination of very high C/S ratios with high lime utilisation efficiencies, even with relatively concentrated liquors, has never been possible using the prior art processes. This flexibility affords considerable scope to apply the process in novel ways in the alumina refinery, using liquor streams that would not be feasible to treat with the prior art processes. While not wishing to be bound by theory, it is thought the following sequence of reactions takes place.

Reaction 1

The inventors have found that in solutions containing both sodium aluminate and sodium hydroxide, calcium hydroxide first reacts to form a lamellar calcium aluminate structure, the interlayer regions of which are filled with charge balancing ions and water molecules. Similar species produced under very different reaction conditions have been reported in the cement industry literature [Fischer, R, and Kuzel H. J., Cement and Concrete Research, 12, (1982), 517-526], where they are designated as C4A compounds. The structures are similar to the naturally occurring mineral hydrocalumite and this name has been used in some work for convenience [Perotta, A J, and Williams, F., Light Metals (1995), 77-87]. The term hydrocalumite will also be adopted throughout the present specification. This hydrocalumite species forms very rapidly in almost any Bayer liquor. No essential difference in the chemistry of the process has been found when calcium oxide (quicklime) is used instead of calcium hydroxide, as the slaking reaction appears to take precedence. However, the efficiency of the reactions using quicklime is poorer than when slaked lime is used, evidently because the reaction products that form tend to inhibit the diffusion of calcium to the particle surface. This results in some lime remaining unreacted.

The general form of the reaction in Bayer-type liquors when calcium hydroxide is used is shown in equation (2) below:

$$4Ca(OH)_2 + 2Al(OH)_4^- + 2X^- + nH_2O \leftrightarrows [Ca_2Al(OH)_6]_2 \cdot nH_2O + 4OH^- \quad (2)$$

The charge balancing anions can be any of a number of species, denoted as $X^-$ in the above equation. A number of species of this general form, varying only in the type and amount of charge balancing anions and interlayer water, have been identified on the basis of their XRD patterns and by chemical analysis. In the absence of other anions (especially carbonate), the charge balancing species is commonly the hydroxyl ion, giving the following equation:

$$4Ca(OH)_2 + 2Al(OH)_4^- + 6H_2O \leftrightarrows [Ca_2Al(OH)_6]_2 \cdot (OH)_2 \cdot 6H_2O + 2OH^- \quad (3)$$

For convenience, hereinafter the species formed in this reaction will be referred to as hydrocalumite 0, or Hc0. Inspection of this reaction shows that while there is no net change in the 'C' concentration of the liquor, the alumina (A) concentration will fall due to the consumption of the aluminate ion. For liquors containing at least some carbonate, one of the hydroxyl ions in the above structure is replaced by one half of a carbonate ion, as follow:

$$4Ca(OH)_2 + 2Al(OH)_4^- + \tfrac{1}{2}CO_3^{2-} + 5\tfrac{1}{2}H_2O \leftrightarrows [Ca_2Al(OH)_6]_2 \cdot \tfrac{1}{2}CO_3 \cdot OH \cdot 5\tfrac{1}{2}H_2O + 3OH^- \quad (4)$$

The species formed in this reaction is referred to hereinafter as hydrocalumite 1 (Hc1). Its formation is a mildly causticising reaction. While two moles of aluminate are consumed per mole of Hc1, three moles of hydroxyl ions are released. Thus, a net increase in 'C' concentration of one mole of hydroxide per 4 moles of calcium hydroxide will be achieved.

Another reaction that has been reported in the literature involves the replacement of two of the hydroxyl ions giving the following equation:

$$4Ca(OH)_2 + 2Al(OH)_4^- + CO_3^{2-} + 5H_2O \leftrightarrows [Ca_2Al(OH)_6]_2 \cdot CO_3 \cdot 5H_2O + 4OH^- \quad (5)$$

This is a more efficient causticising reaction, with 4 moles of hydroxyl ions released for every two aluminate ions consumed. The net increase in 'C' concentration is thus two moles of hydroxyl ions per 4 moles of calcium hydroxide. While the inventors have found that a compound whose XRD pattern very closely matches the above species is involved in the causticisation of Bayer liquors, the change in the solution's carbonate concentration during its formation is inconsistent with the formula shown in equation (5). Thus, it is unlikely that significant amounts of the material indicated in equation (5) are formed during the reaction of lime in aluminate solutions. However, the amount of interlayer water in the hydrocalumite structure is highly variable, and this alters the interlayer distance. A species with a similar XRD pattern to that of the compound in equation (5) is known, and the inventors propose that this species forms in Bayer liquors by the dehydration of Hc1 according to the following equation:

$$[Ca_2Al(OH)_6]_2 \cdot \tfrac{1}{2}CO_3 \cdot OH \cdot 5\tfrac{1}{2}H_2O \rightarrow [Ca_2Al(OH)_6]_2 \cdot \tfrac{1}{2}CO_3 \cdot OH \cdot 4\tfrac{1}{4}H_2O \cdot 1\tfrac{3}{4}H_2O \quad (6)$$

The species formed in this reaction will be referred to as hydrocalumite 2 (Hc2).

Typically, in the course of the reaction of the slaked lime, Hc1 will form first. As the structure ages, often within minutes, a mixture of Hc1 and Hc2 will be produced. Later, as the reaction proceeds and carbonate in the liquor is depleted, only Hc0 will form and the final product will consist of mixtures of Hc1, Hc2 and Hc0. Owing to this dependency upon ageing and carbonate concentration, the precise proportions of Hc0, Hc1 and Hc2 so formed are difficult to estimate in advance. Other reaction conditions will also affect the products to some extent. However, Hc1 is the predominant species formed under most conditions and this species can be used for the purposes of stoichiometry calculations.

The reaction of lime to form hydrocalumite is diffusion controlled, so that the rate of formation is thus not strongly affected by temperature. On the other hand, interconversion between the Hc1 and Hc2 phases does seem to be temperature dependent.

Equations (4) through (6) are key observations in the development of this invention. Many previous studies have assumed the simultaneous formation of calcium carbonate and of TCA, which is caustic neutral, i.e. two hydroxyl ions are released for every two aluminate ions consumed. In contrast, the above equations indicate that the formation of hydrocalumite can be used in the causticisation of Bayer liquors.

It is important to note that the causticising effect of hydrocalumite formation is not subject to the limiting effects of the carbonate/hydroxide equilibrium. Assuming no interference by surface diffusion barriers, hydrocalumite formation will continue until either the calcium hydroxide or aluminate ions are almost completely consumed. To maintain charge neutrality, anions must be intercalated within the structure. Carbonate, the preferred anion, will thus continue to be absorbed into the structure until the material ceases forming, or almost all of the carbonate has been removed from solution. At low carbonate concentrations, other anions may thus be intercalated within the structure, leading to a process for the causticisation of other impurity salts in Bayer liquors. This latter aspect is the subject of a co-pending patent application No. PP9334.

All of these hydrocalumite species are quite stable at low temperatures but become increasingly unstable as the temperature rises. Apart from temperature, the rate of decomposition and the species that forms is also dependent upon the composition of the solution with which they are in contact. The predominant decomposition reactions include a desirable reaction with carbonate ions in which calcium carbonate is formed, and an undesirable reaction in which TCA forms. However, if these compounds form while the calcium hydroxide particles are still reacting to form hydrocalumite, they may act as a diffusion barrier and prevent full conversion. This effect can be overcome by adding a small amount of a suitable inhibitor, such as a complexing agent or surfactant (for example, sodium gluconate or sucrose), as will be discussed further below.

Reaction 2

The conditions under which the above species react to form calcium carbonate can be inferred from the following reaction mechanism:

$$[Ca_2Al(OH)_6]_2 \cdot \tfrac{1}{2}CO_3 \cdot OH \cdot 5\tfrac{1}{2}H_2O + 3\tfrac{1}{2}CO_3^{2-} \leftrightarrows 4CaCO_3 + 2Al(OH)_4^- + 5OH^- + 5\tfrac{1}{2}H_2O \qquad (7)$$

This is the main causticising reaction, and in conventional causticisation processes will begin almost immediately upon formation of the hydrocalumite. Inspection of the above equation shows that in this reaction, each mole of Hc1 reacts with 3.5 moles of carbonate to produce 4 moles of calcium carbonate, and releases 5 hydroxyl ions, together with 2 moles of aluminate Thus, any aluminate consumed during the formation of the hydrocalumite (be it Hc0, Hc1 or Hc2) is released again in this reaction.

Consequently, in a conventional causticisation reaction, it is observed that the alumina concentration falls very rapidly, normally accompanied by a slight rise in C/S, corresponding to the formation of hydrocalumite. This is then followed by a slower but much greater rise in C/S, together with an increase in alumina concentration, as the reaction described in equation (7) proceeds.

The reaction of hydrocalumite with carbonate ions to form calcium carbonate is favoured by conditions of high carbonate concentration, low aluminate concentration and low hydroxide concentration. It is important to note that the reaction is under chemical control, and is thus relatively unaffected by agitation conditions. However, the rate is strongly influenced by temperature, with the rate increasing by approximately one order of magnitude (10-fold) for every 6 to 8 degrees increase in temperature. Consequently, the inventors have found that at 103° C. the reaction can take up to approximately 2 hours to come to completion, but only a few minutes at 120° C.

It is also important to note that the extent of this reaction will be controlled by the equilibria between the solids and the various species in solution. Consequently, the maximum achievable C/S will be a function of the activities of the carbonate, hydroxide and aluminate ions. Inspection of equation (7) shows that the equilibrium is much more strongly affected by the hydroxide concentration than the aluminate concentration, so it is of some benefit if the liquor fed to this process has a high A/C ratio (i.e., low free caustic). This can be facilitated by ensuring that the hydrocalumite is not formed in the liquor to be causticised, since this reaction will lower the A/C. However, the rate of equation (7) is impaired if the aluminate concentration is too high. A preferred A/C range is between 0.5 and 0.7.

Increasing the temperature also drives the equilibrium towards the products of this reaction, allowing a higher C/S to be reached. The rate of the reaction is also substantially increased. This is particularly beneficial with high A/C ratio liquors. However, if the temperature is too high efficiency will suffer because the rate at which TCA forms, while not strongly temperature dependant, does increase with rising temperature. Consequently, best performance will be achieved with a liquor with a moderately high A/C ratio, and at a temperature of between 120° C. and 140° C.

Reaction 3

The final reaction to consider is the formation of TCA. TCA ($Ca_3[Al(OH)_6]_2$) has a similar chemical formula to the hydrocalumites, and it is reasonable to consider that this species may react under the appropriate conditions to form TCA. Indeed, this seems to be the case The inventor's experimental evidence suggests that hydrocalumite reacts with aluminate and hydroxyl ions to form TCA. It does not appear to be important which of the Hc species described previously (Hc0-Hc2) is involved in this reaction. Consequently, using Hc1 as an example, it is believed the following reaction describes the formation of TCA:

$$3[Ca_2Al(OH)_6]_2 \cdot \tfrac{1}{2}CO_3 \cdot OH \cdot 5\tfrac{1}{2}H_2O + 2Al(OH)_4^- + OH^- \rightarrow 4Ca_3[Al(OH)_6]_2 + \tfrac{1}{2}CO_3^{2-} + 16\tfrac{1}{2}H_2O \qquad (8)$$

This reaction is favoured by high aluminate and hydroxide concentrations and low carbonate concentration. These conditions are met towards the conclusion of the conventional causticisation process, which may explain the appreciable losses of lime to TCA, and the steady fall of C/S over time if the residence time in the causticiser is excessive. Furthermore, the above reaction appears to be under diffusion control—agitation and the presence of a large hydrocalumite surface area strongly affects the rate of formation of TCA, but it is less strongly affected by increasing temperature. Thus, a suitable balance of high temperatures and gentle agitation during the main causticisation reaction (equation 7) will decrease TCA formation (and improve efficiency) because the rate of consumption of hydrocalumite to form calcium carbonate greatly exceeds the rate of its reaction to form TCA.

By considering the reactions described above, it is clearly possible to develop a process in which the desirable steps are optimised, while the undesirable reactions are minimised. This is not feasible in a single tank (unless the tank is operated in batch mode and the conditions varied during the course of the reaction), because each of these steps requires mutually incompatible conditions to operate efficiently. In all prior art processes, the individual steps of the causticisation reaction are not identified or optimised in this way. Consequently, the causticisation process as currently practised is an unsatisfactory compromise between acceptable lime and alumina losses and extent of causticisation.

Design Principles

In developing an improved causticisation process, the inventors have identified the following design principles:

Slaked lime or quicklime is preferably first reacted with aluminate ions to form only the lamellar C4A structure (the hydrocalumite), in a well agitated reactor (the Primary Causticisation Reactor). The exact nature of this reactor is not critical, and any system which provides adequate mixing of the reactants will suffice. To ensure that this occurs with no residual unreacted lime, and to prevent calcium carbonate or TCA formation, certain conditions must be met. The reaction should occur under conditions of low to moderate temperature (between 25 and 100° C.). The exact upper limit is a function of the alumina, carbonate and free hydroxide concentrations, but best performance with most liquors is obtained if the temperature is maintained between 70° C. and 80° C. Best performance is obtained with a liquor with a moderately high A/C ratio and low free caustic. If too high a temperature is chosen, or too high free caustic concentration, there is a tendency for the reaction to be impeded by the formation of TCA, which acts as a diffusion barrier. This will tend to prevent full reaction of the calcium hydroxide, producing particles with a core of unreacted lime, reducing the efficiency of the reaction. The carbonate concentration is less important, but the lower the carbonate concentration, the lower the maximum temperature at which this step in the process can be operated. Suitable liquors will have an 'S' concentration of between 40 and 200 g/L (preferably between 120 and 160 g/L), and an A/C ratio of between 0.2 and 0.95 (preferably greater than 0.55). The residence time required for the completion of this reaction is typically between 5 and 30 minutes. However, if the correct liquor composition and temperature are used, longer residence times will have no discernible negative effects.

In a typical application of the principles described so far, the hydrocalumite and the liquor in contact with it are then heated to force the reaction described in equation (7) to proceed. The slurry should be heated as hot as practicable. In a continuous system, this will necessitate transfer of the slurry to a second reactor (the Secondary Causticisation Reactor). In a simple non-pressurised stirred tank, the liquor should preferably be heated to close to the boiling point of the slurry Agitation in such a system must be given special consideration. If the agitation is vigorous, hydrocalumite will react with aluminate and hydroxyl ions forming TCA and causing a loss of efficiency. Preferably, a low-shear plug flow reactor (such as a tube reactor) will be employed operating at temperatures between 100 and 180° C., although best performance will be obtained at about 120° C. The precise residence time required to react the hydrocalumite formed in step 1 is dependent upon many factors, especially the temperature and presence of surfactants. However, a typical stirred tank reactor operating at approximately 103° C. will require in the vicinity of 2 hours to reach completion, while approximately 15 minutes will be required in a tube reactor operating at 120° C.

Ideally, the slurry formed in step 1 should be filtered or some other means of separating the solid and liquid employed. The solids should then be reacted with a fresh liquor to be causticised Ideally, the liquor causticised in the Secondary Causticisation Reactor should be used as the feed liquor for the Primary Causticisation Reactor This will ensure that the A/C ratio of the liquor feeding the Primary Reactor is high. More importantly, it permits even higher C/S ratios to be achieved, as the formation of the hydrocalumite is a causticising reaction Since this reaction is not subject to the same equilibria as that occurring in the Secondary Reactor, it is possible to achieve C/S ratios of close to 1.00 in this reactor if sufficient lime is added.

Effect of Additives

During the course of the development of this process, the inventors found that if suitable inhibitors were added, the undesirable reaction of the hydrocalumite to form TCA could be greatly reduced, without appreciably influencing the reaction of Hc with carbonate to form calcium carbonate. This results in greater maximum C/S values being achieved, with higher efficiency of lime utilisation and greater ease of use. This arises because the reaction of hydrocalumite with aluminate and hydroxyl ions to form TCA is diffusion controlled (equation 8), while the reaction of Hc with carbonate is not (equation 7) Consequently, compounds that adsorb at active sites at the Hc surface will inhibit the diffusion of active species at these sites, retarding the reaction. On the other hand, while the presence of these adsorbed molecules may also partially inhibit the reaction with carbonate, the effect will be far less. This decrease in the rate of reaction of Hc with carbonate can be suitably overcome by enhancing any of the factors known to improve the causticisation reaction, of which increasing the temperature is probably the most effective and simple to achieve.

Virtually any class of surfactant can be used in this context, providing it adsorbs to the hydrocalumite structure. For example, sugars such as sucrose and glucose, and polysaccharides such as starch can be used. However, the inventors have found that anionic organic surfactants are most effective. A non-exclusive list of examples of this class of compound includes the following materials, their salts and derivatives: any anionic homopolymers or copolymers (e.g. polyacrylic acid and its co-polymers with acrylamide, or polymers bearing hydroxamate functional groups), hydroxamic acids, humic and tannic acids, lignosulphonates, fatty acids, sulphonated carboxylic acids, carboxylic acids, and polyhydroxy carboxylic acids.

The addition of the inhibitor can be made at any point prior to or within the Secondary Causticisation Reactor. Thus, the inhibitor may be added with the lime or liquor to be causticised, into the Primary Reactor, or into the secondary Reactor itself. It is also possible to dose the inhibitor into other locations with the Bayer refinery, provided that a significant proportion of the material reports to the causticiser Addition prior to the Primary reactor greatly enhances the crystallinity of the hydrocalumite, and tends to produce hydrocalumite almost exclusively of the Hc1 variety (in the presence of adequate carbonate). However, while this enhanced crystallinity appears to have some benefit, the preferred dosing point is to the Secondary Reactor, whereupon good causticisation results are obtained with minimum consumption of inhibitor.

The use of an inhibitor also appears to improve the performance of conventional (prior art) causticising circuits. The presence of the inhibitor stabilises the hydrocalumite as it forms, preventing the usual simultaneous side-reaction that leads to the formation of TCA Significant improvements in lime utilisation efficiency and liquor causticity can thus be achieved by dosing a suitable inhibitor at any point prior to the causticisation reactor, or into the reactor itself. However, the rate of the causticising reaction is also partially inhibited and allowance must be made for this either by increasing the residence time within the reactor, or, more preferably, by increasing the temperature. The applicable temperature range, as with the process disclosed within this patent, is between approximately 100° C. and 180° C., preferably between 120° C. and 140° C.

The amount of inhibitor to be dosed is dependent upon the nature of the inhibitor and the location of its addition point into the causticisation circuit. Thus, the dose rate for a particular inhibitor must be determined by experiment. Examples of the action or inhibitors and their associated dosages are reported elsewhere in this document.

The invention is further described and illustrated by the following examples These examples are illustrative of a variety of possible implementations and are not to be construed as limiting the invention in any way. In each of the following described examples dosing with a suitable inhibitor will provide enhanced performance.

EXAMPLE 1

Figure 1:
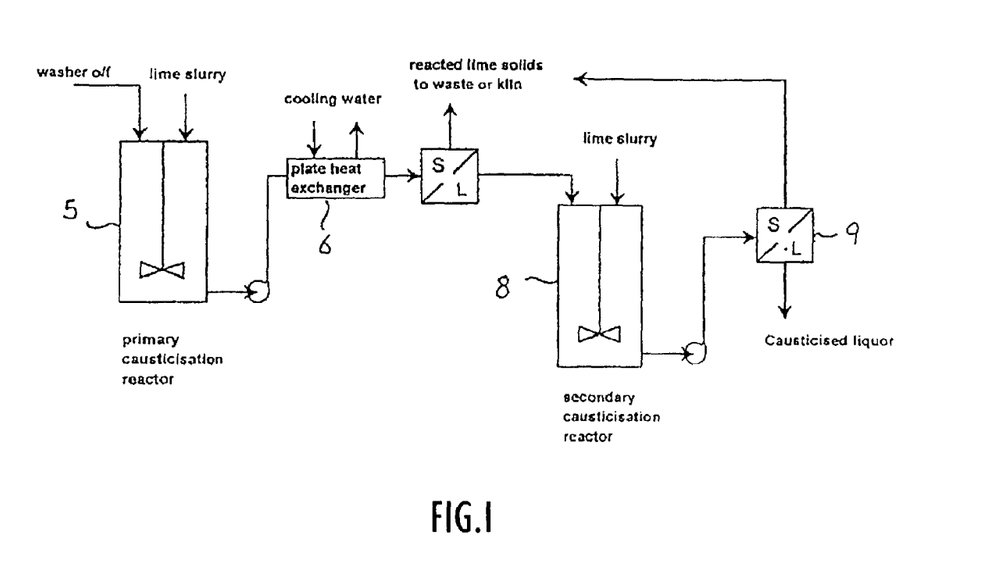
FIG. 1 is a simplified conceptual flow diagram of a basic implementation of the improved causticisation process according to the invention.

A basic implementation of an improved causticisation process based on the first of the above design principles is shown in FIG. 1. In this system a conventional causticiser is employed as the primary reactor 5 and the secondary causticiser 8 is used to form the hydrocalumite species. This system utilises dosing of lime slurry to both the primary and secondary causticisers. Because the hydrocalumite formation occurs in the second reactor, and is not further utilised, this configuration does not exhibit high lime utilisation efficiency. However, it represents a simple method of boosting the C/S ratio of a liquor, effectively adding "trim" causticisation to a conventional causticiser.

Best performance is obtained by first causticising the liquor using a high temperature tube digestor for the primary causticiser 5, followed by plate or flash cooling 6 to between 20° to 100° C., more preferably between 70 to 80° C. Agitation conditions within the secondary or "trim" causticiser 8 are not critical, although the tank's contents should preferably be completely suspended The amount of lime required in this reactor will depend upon the level of C/S boost required, and can be determined from the stoichiometry described by equation (4).

In the example given here, the Hc formed in the "trim" causticiser 8 is filtered 9 and combined with the waste lime products from the Primary causticiser 5, both of which are then disposed of. An alternative is to use the Hc to effect further causticisation, improving lime utilisation efficiency and recovering aluminate ions. This can be achieved by directing the solids to another reaction vessel fed with a fresh liquor stream to be causticised, however a more preferable embodiment of the invention is disclosed in Example 2.

EXAMPLE 2

Figure 2:
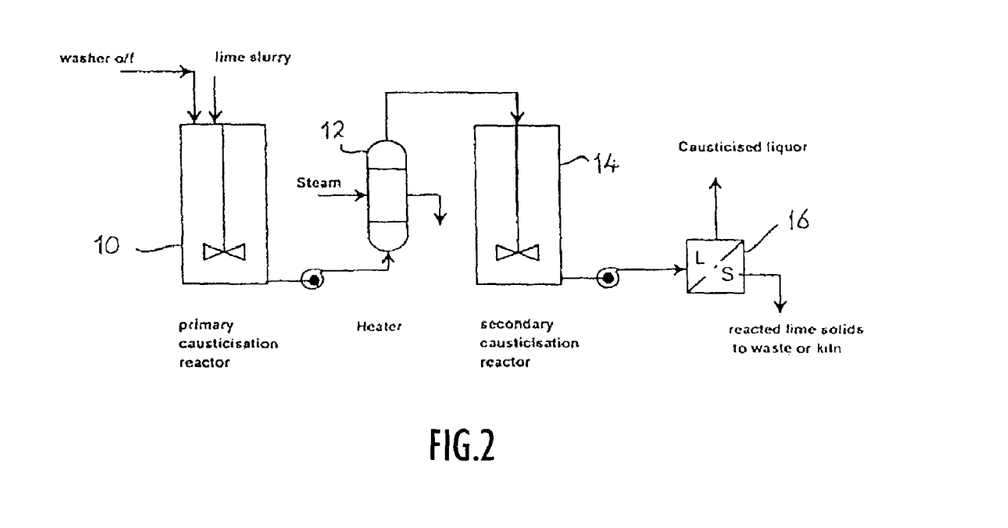
FIG. 2 is a simplified conceptual flow diagram illustrating a further implementation of the improved causticisation process according to the invention.

A typical implementation of the improved causticisation process based on the first two of the preceding principles is shown in FIG. 2. In this system, a lime source (preferably a paste or slurry of slaked lime, although quicklime can be used) is fed together with the liquor to be causticised into a primary reactor vessel 10. Primary reactor 10 may be an in-line mixer, tubular reactor or stirred tank. Agitation conditions within this reactor 10 are not critical, although the reactor's contents should be completely suspended. In this system, the vessel 10 is typically a stirred tank reactor and the liquor to be causticised will typically be a first or second washer overflow, as indicated in FIG. 1, although the process is in no way restricted to these. The applicable range of 'S' concentration should be in the range of 40 to 250 g/L, although best performance is obtained for 'S' concentrations between 80 and 160 g/L. Improved performance is obtained for liquors with high A/C ratios The temperature in this tank should be between 20 and 100° C., although best performance is obtained at between 70 and 80° C. The residence time in this tank should be approximately 5 to 20 minutes, but extended residence times of 2 hours or more have little appreciable deleterious effect. The purpose of this reactor is to react the lime to form pure Hc1, with little or no unreacted lime, calcium carbonate or TCA The slurry is then fed to a heater 12 and heated If existing causticisation equipment is utilised, the slurry should be heated to just below the atmospheric boiling point of the slurry. For most washer overflow liquors, this will be in the range 102° C. to 105° C. Preferably, however, the slurry is heated to higher temperatures, typically between approximately 100° C. and 180° C., more preferably to between 120° C. and 140° C. The discharge from the heater 12 is fed to a secondary reactor 14, in which agitation conditions are controlled such that the solids are just suspended. This reactor 14 can be CSTR, but ideally it will be a plug flow reactor. Under the above conditions, a residence time of approximately 2 hours will be required at approximately 103° C., and about 10 minutes at 120° C. The products of this tank are cooled (if required) and fed to a solid/liquid separation device 16 such as a settling tank, centrifuge, or preferably a filter.

The causticised liquor is returned to the process. Typically this would involve returning it to the mud settler or mixing it in a tank with the clarified settler overflow liquor. The reacted lime solids can be disposed of, but since they are almost exclusively calcium carbonate, they can alternatively be further washed and filtered to recover adhering soda. The solids can then be dried and calcined to regenerate calcium oxide for further use. The washings can be returned to the mud washing circuit, or used elsewhere in the plant.

This scheme improves the efficiency of lime utilisation by ensuring that very little lime remains unreacted due to the formation of surface materials capable of acting as diffusion barriers. The loss of alumina through the formation of TCA is also greatly decreased. However, the maximum achievable C/S using this system is equivalent to a conventional causticisation process, unless elevated temperatures and/or an inhibitor are employed.

EXAMPLE 3

Figure 3:
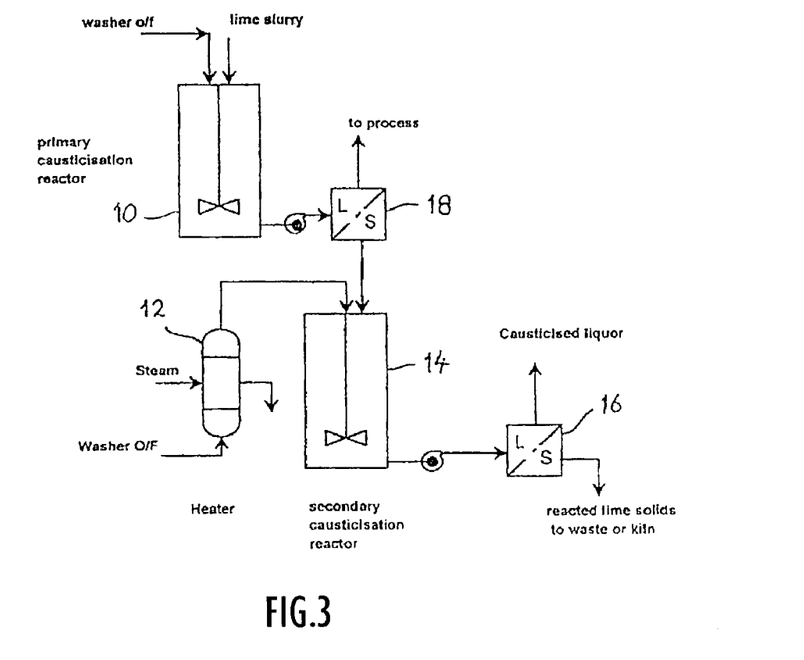
FIG. 3 is a conceptual flow diagram illustrating an enhancement of the process illustrated in FIG. 2.

Improved performance can be obtained by applying the third design principle—forming the hydrocalumite in another liquor, separating the solid product and liquor in a solid/liquid separation device 18, and using the hydrocalumite cake as the causticising agent in a secondary tank 14 fed with a suitable liquor stream. A simple conceptual flow diagram depicting this process is shown in FIG. 3 Similar plant components as in FIG. 2 are identified with the same reference numerals.

In this configuration, the A/C ratio of the liquor feeding the secondary causticiser 14 is maintained at a high level. This is aided by the reaction of Hc1 according to equation (7) The high A/C ratio alters the equilibria in the secondary causticiser 14, permitting higher C/S ratios to be achieved. Of course, more lime is required to achieve these higher C/S ratios, but the lime efficiency is high, with low alumina losses. Some causticisation also occurs in the Primary Causticiser 10, contributing to the carbonate removal efficiency of the system.

EXAMPLE 4

A substantial improvement over the basic implementations described above is shown in FIG. 4. In this embodiment, all four of the design principles have been incorporated. Lime is fed into a reaction vessel 10 (primary causticisation tank) operating at between 40 and 100° C., more preferably 70 to 80° C., together with a proportion of the causticised stream from the secondary causticisation tank 14. By doing this, a stream with an enhanced A/C and low carbonate concentration is fed into the primary reactor 10. The lime reacts with the aluminate ion to form the hydrocalumite species, and further causticises the liquor according to the reaction scheme described by equation (4) [and in some instances, possibly equation (5)]. The product thus formed is a pure hydrocalumite species containing a variable amount of carbonate, the extent depending upon the initial carbonate concentration of the liquor and the amount of lime added Under the conditions described above, the amount of unreacted lime in the discharge from the primary causticiser 10 is low. This hydrocalumite material forms the raw material for the secondary causticisation step, and is separated from the now highly causticised liquor produced in the Primary Causticiser 10. The causticised liquor is then returned to the plant at a suitable location, such as the mud settlers or polishing filters. The separation step can be affected using any solids/liquid separation device 18 including gravity settling, cycloning, or centrifugation, but best performance is obtained by filtration. This filtration is simple to achieve, as the morphology of the solids obtained in this step facilitates easy separation.

Figure 4:
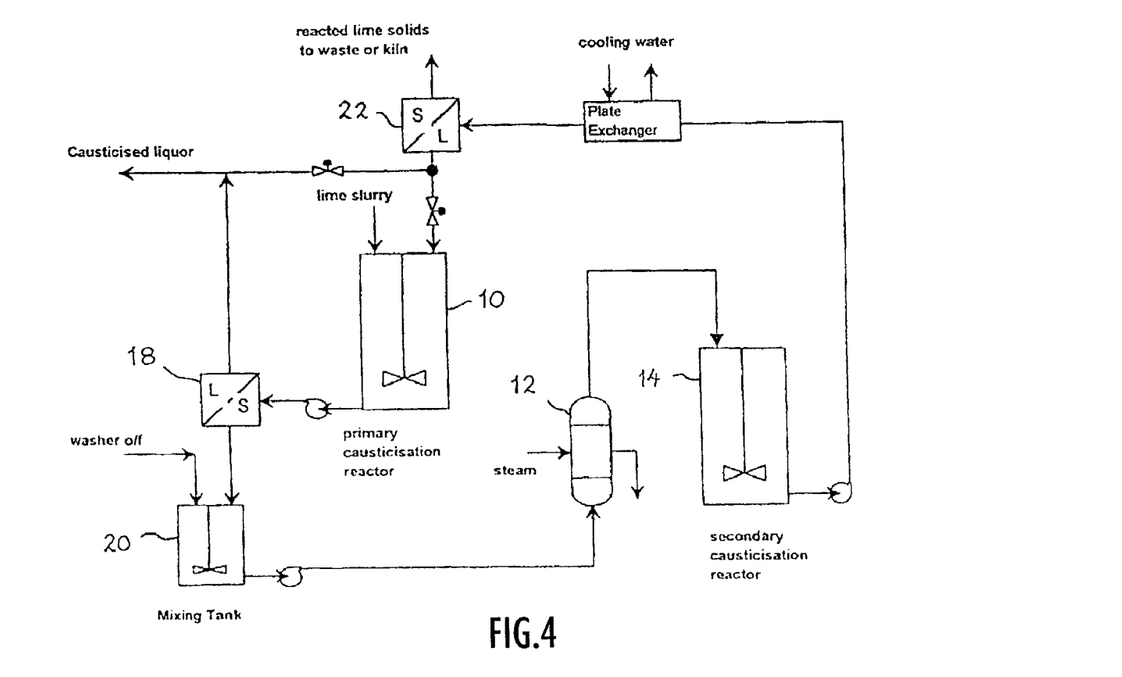
FIG. 4 is a conceptual flow diagram illustrating a further enhancement of the process illustrated in FIG. 3.

The filtered cake is reslurried with the clarified fresh liquor to be causticised in mixing tank 20. The temperature of this stream should be between 40 and 100° C., more preferably between 70° C. and 80° C. The liquor can be any process stream with an 'S' concentration between 40 and 350 g/L as $Na_2CO_3$. However, best performance will be obtained with more dilute liquors with an 'S' concentration of between 100 and 160 g/L. The reslurried liquor is then heated to close to the atmospheric boiling point of the slurry in heater 12 and directed to the secondary causticisation reactor 14, where it is held for between 30 minutes and 4 hours, preferably 2 hours at 103° C., during which time the reaction described by equation (7) occurs. The agitation conditions within this tank should be controlled such that all of the solids are suspended, but excessive agitation should be avoided to minimise the formation of TCA. Preferably, a plug flow reactor is used although a stirred reactor vessel is quite adequate.

The reacted slurry is then pumped to a solid/liquid separation device 22 such as a gravity settler, cyclone, centrifuge or preferably filter. The solids may be discarded, however the very high efficiency of the process (producing almost pure calcium carbonate) as described in all of the Examples other than Example 1 allows the solids to be washed (and the washings returned to the mud washing circuit) and calcined to re-generate the quicklime. Thus, the consumption of quicklime by the refinery can be substantially reduced using this process.

A portion of the clarified liquor from the second stage causticisation reactor 14 is split and directed to the primary causticisation reactor 10 to form the hydrocalumite species. Best causticisation performance will be obtained by directing the entire flow to the Primary causticiser tank 10, but this will require greater filtration capacity. Performance is enhanced using this technique, because the products of reaction will contain more hydrocalumite 2 The amount of lime to be added is calculated from the requirements of the Secondary Causticisation reactor 14. This can be estimated from the stoichiometry shown in equation (7), and from the calculated carbonate/hydroxide/aluminate equilibrium for the liquor to be causticised.

Clearly, given the relative causticising efficiencies of equations (4) and (7), less lime will be required to achieve the calculated C/S ratio in the secondary reactor than would be required to fully causticise the liquor in the Primary reactor. However, if some loss of lime efficiency and alumina can be tolerated, it is possible to use this process to causticise the liquor to very high C/S ratios by overcharging the Primary causticiser with lime.

EXAMPLE 5

Figure 5:
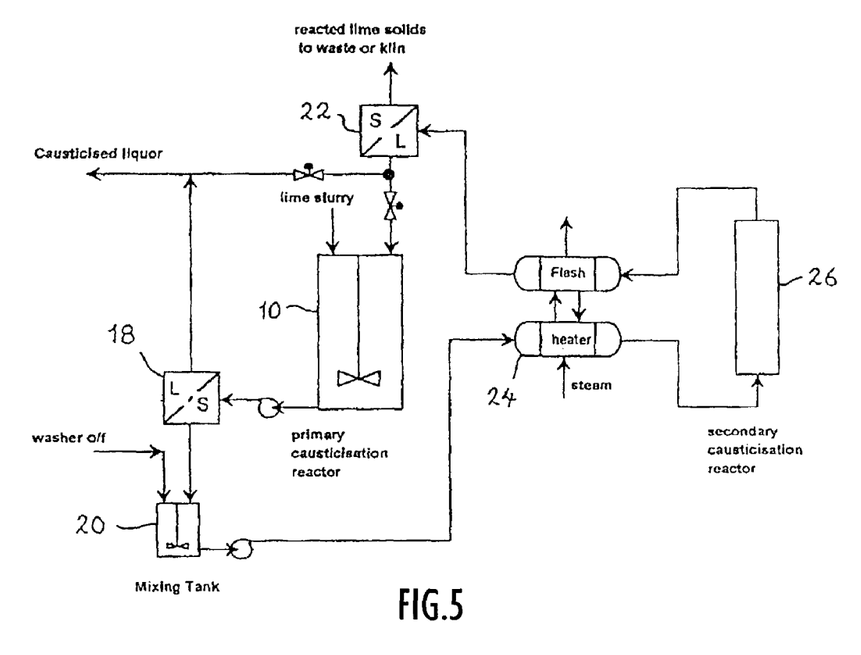
FIG. 5 is a conceptual flow diagram of a preferred embodiment of the improved causticisation process according to the invention.

The performance of the system can be further enhanced by conducting the secondary causticisation process at elevated temperatures (between 100° C. and 180° C.). Best performance is obtained at about 120° C. The preferred embodiment of this process is shown in FIG. 5.

In this system, the slurry from the mixing tank is directed to a heat exchange 24 where the temperature is raised to 120° C. The slurry is then passed through a secondary pressure reactor, preferably a tube reactor 26, with a residence time of 5 to 40 minutes, preferably 15 minutes. Longer residence times may be required in the presence of an inhibitor, depending upon its nature. By operating at this temperature, and using this configuration, the efficiency of the reaction of the hydrocalumite to form calcium carbonate is greatly enhanced, while the formation of TCA is greatly inhibited.

EXAMPLE 6

The efficiency of the process of Example 5 falls as the C/S of the plant liquor approaches or exceeds the carbonate/hydroxide/aluminate equilibrium value in the Secondary causticiser. At some point, a steady state will be achieved at which the input of carbonate to the plant is balanced by the ability of the causticisation process to remove it. In most circumstances this will not be a problem, as the plant C/S ratio achievable using this process will be very high. However, if higher C/S ratios are required, this can be achieved by overcharging lime to the Primary Causticiser 10, as indicated in the previous Example. The problem with this is that if the C/S of the liquor feeding the secondary causticiser is too high for reaction (7) to proceed, the lime utilisation efficiency will be poor, and alumina will be lost.

Figure 6:
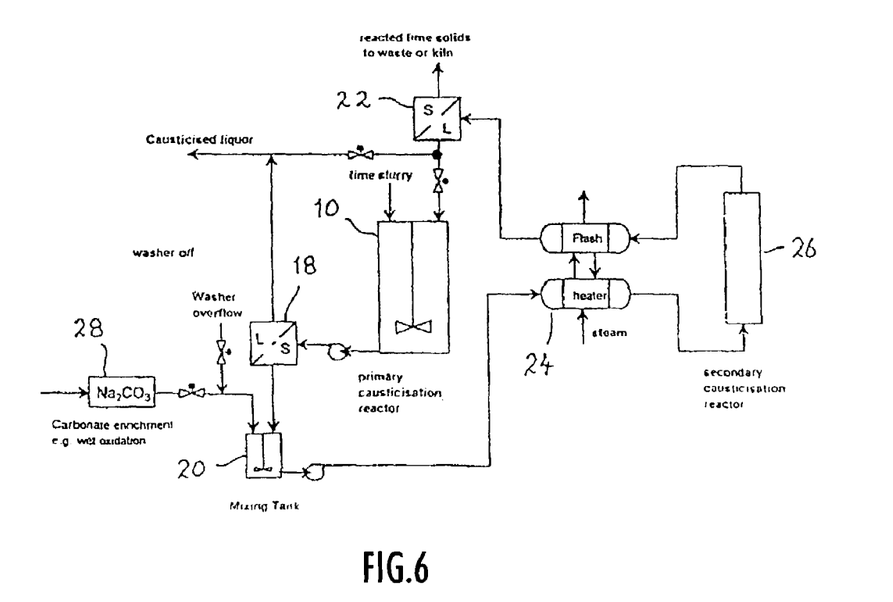
FIG. 6 is a conceptual flow diagram of another embodiment of the improved causticisation process according to the invention.

This situation can be corrected using the enhancement shown in FIG. 6. In this process, the flow of liquor to the Secondary Causticiser 14 is supplemented by a stream 28 that is rich in sodium carbonate. This can be supplied in various ways, such as via a salting out evaporator, as Trona (to supplement existing caustic input to the plant), or by linking the discharge from an oxidative organics removal process, such as wet oxidation or electrolysis. In this way, the process can efficiently causticise the sodium carbonate in these streams, as well as recovering all of the alumina that would otherwise be lost. The lime efficiency can be restored to greater than 90% in this way. It should be noted that by using this process, it is possible to increase the refinery's C/S to close to 1.00, depending upon the amount of carbonate produced in the digestion circuit and the size of the units employed.

Experimental Results

Effect of Inhibitors

A number of inhibitors representative of the classes of compound described earlier were examined for their impact on causticisation in a series of batch tests. These tests loosely simulate the prior art causticisation process, and serve only to demonstrate the advantages of the use of inhibitors in this regard. An inhibitor that performs well in these tests is even more effective when used at the correct dose in the proposed improved causticisation process.

The tests were conducted in 500 mL polypropylene bottles to which 450 mL of a first washer overflow liquor pre-heated to 97° C. were added. The composition of the liquor prior to addition of the lime slurry and additive is shown in Table 1 below

TABLE 1

| Composition of $1^{st}$ washer overflow liquor | | | | |
|---|---|---|---|---|
| A (g/L) | C (g/L) | S (g/L) | A/C | C/S |
| 81.1 | 122.5 | 151.0 | 0.662 | 0.811 |

A lime slurry consisting of 58 g of an industrial grade hydrated lime (90.3% available lime as $Ca(OH)_2$) in 216 mL of deionised water was prepared and heated to 97° C. 30 mL of this slurry was added to each of the bottles, together with sufficient of the appropriate additive to give a 1 g/L concentration in the resultant mixture. The bottles were sealed and tumbled end-over-end in a thermostatically controlled water bath at 97° C. These agitation conditions are far less vigorous, and the temperature somewhat lower, than is typical of industrial conditions. This, together with the retarding effect of the additives themselves on the causticisation reaction rate, required extended residence times to be used. The results of the bottle tests taken after 360 minutes of reaction are shown in Table 2.

TABLE 2

Liquor composition after 360 minutes reaction.

| Additive | A (g/L) | C (g/L) | S (g/L) | A/C | C/S | Lime Efficiency |
|---|---|---|---|---|---|---|
| None | 67.6 | 119.3 | 131.8 | 0.567 | 0.905 | 68% |
| Sucrose | 69.1 | 121.5 | 131.8 | 0.569 | 0.922 | 80% |
| Commercial hydroxamate copolymer | 67.4 | 120.3 | 131.4 | 0.560 | 0.916 | 75% |
| Polyacrylate (MWt < 1M) | 67.8 | 119.3 | 131.2 | 0.568 | 0.909 | 71% |
| Commercial polyacrylate (MWt. > 1M) | 67.7 | 120.1 | 131.4 | 0.564 | 0.914 | 74% |

These results clearly show the advantages of inhibitors in Bayer causticisation, both in increased liquor causticity (C/S) and efficiency of lime utilisation. Through suitable optimisation of additive dose rate, causticiser residence time and reactor temperature, substantial improvements in causticisation performance can be achieved, even when applied to the prior art causticisation processes However, these advantages are particularly pronounced when applied to the improved causticisation process disclosed in this document Comparison of Improved Causticisation Process with Prior Art A series of batch causticisation tests were conducted in the laboratory to demonstrate the improved performance and advantages of the proposed causticisation process. The prior art process was also simulated for the purposes of comparison.

Prior Art Example

The prior art process was simulated by batch reaction in a 3.75 litre Parr reactor. First washer overflow liquor (1.795 litres) was added to the reactor and heated to 100° C. A slurry of an industrial grade hydrated lime (32.7 g) in 203 mL of deionised water was pre-heated to 95° C., before addition to the reactor. This amount of lime was calculated to achieve a target C/S of 0.950 (assuming 100% efficiency). After addition of the lime slurry, the reactor was sealed and permitted to react at 100° C. under thermostatic control for three hours. Agitation was applied using twin pitched-blade turbine impellers operating at 200 rpm. Samples of both the liquor and solids were taken at regular intervals. Liquor samples were analysed for A, C and S and total sodium content. Solids were analysed for their elemental composition by XRF, and for their $CO_2$ content by acidification and measurement of the evolved gas.

Prior Art Example—Effect of Inhibitor

The test procedure described above was repeated, with the addition of 0.1 g/L of sodium gluconate to the first washer overflow liquor. Additional residence time was provided to compensate for the effect of the inhibitor on the rate of the causticisation reaction.

The effect of this inhibitor on the prior art process can be seen by referring to Tables 3 and 4 below. The data shown are for samples taken at the maximum C/S for each case for the Prior Art example, this occurred at approximately 45 minutes residence time in the reactor. In the case of the test in which inhibitor had been added, a similar C/S was achieved at 45 minutes but continued to rise until a maximum was reached at between 260 and 330 minutes

TABLE 3

Effect of Inhibitor on Prior Art Causticisation Performance

| Sample | A (g/L) | C (g/L) | S (g/L) | A/C | C/S | TS (g/L) |
|---|---|---|---|---|---|---|
| Start liquor | 92.7 | 138.8 | 170.6 | 0.668 | 0.813 | 227.1 |
| Prior Art | 81.9 | 137.8 | 155.2 | 0.594 | 0.888 | 207.0 |
| Prior Art + inhibitor | 82.6 | 141.8 | 154.7 | 0.583 | 0.917 | 205.8 |

TABLE 4

Typical Solids Analyses at Maximum C/S (% dry weight)

| Sample | CaO | $Al_2O_3$ | $CO_2$ | Other | Lime Efficiency |
|---|---|---|---|---|---|
| Prior Art | 50.6 | 9.2 | 20.6 | 19.6 | 54.3% |
| Prior Art + inhibitor | 52.6 | 3.8 | 31.0 | 12.6 | 78.6% |

The lime efficiency was calculated on the basis of the $CO_2$ content divided by the CaO content, expressed as a molar ratio and corrected for the available lime and alumina content of the original hydrated lime.

It can be seen that the addition of the inhibitor has resulted in a dramatic increase in the efficiency of lime utilisation, reflected both in the much higher maximum C/S and the higher alumina concentration in the causticised liquor This latter aspect is also apparent from the solids analysis, which shows that substantially lower alumina losses are incurred. These outcomes are achieved, however, at the expense of a much longer reaction time, which can be overcome either by providing additional causticiser tank volume or by raising the reaction rate by increasing the temperature. However, better performance is obtained by using one of the preferred embodiments described in the Examples Improved Causticisation Process (Example 2)

The application of the improved causticisation process in a basic form (as described in Example 2) was simulated by batch reaction in a 3.75 litre Parr reactor. The simulation consisted of two parts—formation of hydrocalumite at 80° C., followed by rapid heating and reaction of the mixture to 120° C. Owing to the high thermal mass and slow heating rate of the Parr reactors, it was necessary to react the lime in a reduced volume of liquor at 80° C., and then add the remaining liquor at a much higher temperature to achieve rapid heating of the mixture to 120° C.

First washer overflow liquor (500 mL) was added to the reactor and heated to 80° C. A second Parr reactor of two litre capacity was filled with first washer overflow liquor (1.500 litres) and heated to 185° C. A slurry of an industrial grade hydrated lime (38.01 g) in 210 mL of deionised water, pre-heated to 80° C., was added to the 500 mL of liquor in the first reactor. This amount of lime was calculated to achieve a target C/S of 0.950 (assuming 100% efficiency). The reactor was immediately scaled and permitted to react under thermostatic control at 80° C. for ten minutes. Agitation was applied using twin pitched-blade turbine impellers operating at 200 rpm. At the conclusion of the ten minute reaction, during which hydrocalumite was formed, the contents of the second reactor were transferred under pressure to the first reactor. Upon mixing, the combined temperature of the liquor and slurry in the first reactor was 120° C. This temperature was maintained thereafter by thermostatic control. The mixture, still agitated at 200 rpm, was permitted to react for 90 minutes Samples of both the liquor and solids were taken at regular intervals. Liquor samples were analysed for A, C and S and total sodium content. Solids were analysed for their elemental composition by XRF, and for their $CO_2$ content by acidification and measurement of the evolved gas Improved Causticisation Process (Example 2)—Effect of Inhibitor The test procedure described above was repeated, with the addition of 0 5 g of sodium gluconate to the 3.75 litre reactor at the end of the 10 minute hydrocalumite formation stage. This gave a final concentration of approximately 0.25 g/L in the combined liquor during the main causticisation reaction.

A similar test using sucrose as inhibitor was also conducted. In this instance, the sucrose was added at the commencement of the reaction, at a concentration of 2.0 g/L in the combined liquor.

Typical results from each of the above tests are summarised in Tables 5 and 6 below, showing the liquor and solids analyses respectively. The results are compared with a repeat test of the Prior Art process for reference. In each case, the results shown represent the highest C/S achieved during the reaction. For the prior art process, this was achieved after 45 minutes of reaction, whereas for the Improved Process without inhibitor only 2 minutes was required. A similar C/S was also achieved in two minutes in the case of the Improved Process to which inhibitor was added, however the C/S continued to rise well beyond this point, finally reaching a maximum after approximately 45 to 60 minutes.

TABLE 5

Typical liquor analyses at maximum C/S

| Sample | A (g/L) | C (g/L) | S (g/L) | A/C | C/S | TS (g/L) |
|---|---|---|---|---|---|---|
| Start liquor | 86.8 | 133.9 | 166.4 | 0.648 | 0.805 | 229.0 |
| Prior Art | 77.1 | 134.5 | 152.5 | 0.573 | 0.882 | 200.9 |
| Example 2 | 77.3 | 136.1 | 151.7 | 0.568 | 0.897 | 207.1 |
| Example 2 + inhibitor | 78.8 | 141.2 | 152.8 | 0.558 | 0.924 | 208.0 |

TABLE 6

Typical solids analyses at maximum C/S (% dry weight)

| Sample | CaO | $Al_2O_3$ | $CO_2$ | Other | Lime Efficiency |
|---|---|---|---|---|---|
| Prior Art | 50.6 | 9.2 | 20.8 | 19.4 | 54.8% |
| Example 2 | 51.6 | 6.6 | 26.6 | 15.2 | 68.8% |
| Example 2 + inhibitor | 52.8 | 3.6 | 34.4 | 9.2 | 86.9% |

The lime efficiency was calculated on the basis of the $CO_2$ content divided by the CaO content, expressed as a molar ratio and corrected for the available lime and alumina content of the original hydrated lime.

The liquor chosen to demonstrate the process is of a higher 'S' concentration than is typically used for causticisation in most Bayer process refineries. The reason such a liquor would not normally be used for this purpose is apparent from the lime efficiency results shown in Table 6 The lime efficiency shown for the Prior Art process (54%) was obtained from a sample drawn at the maximum C/S for the reaction and therefore represents the maximum efficiency obtained. This optimum is rarely achieved in industrial practice, so the efficiency would normally be substantially less than this.

By contrast, a higher maximum C/S and substantially improved lime efficiency are observed for the Example 2 process. Maximum C/S is achieved rapidly (2 minutes) and remains there for approximately a further 8 minutes before reversion becomes significant.

Even more striking is the result for the Example 2 process to which an inhibitor (sodium gluconate) had been added. In this case, a far higher maximum C/S was achieved, at over 30% greater lime efficiency than the Prior Art process. Moreover, reversion is extremely slow: after a further 30 minutes at temperature, the C/S had fallen only 0.002 points. Similar results were obtained for the test in which sucrose was used as the inhibitor, achieving an identical C/S of 0.924 but at a slightly lower lime efficiency of 84.0%. However, the time required to achieve maximum C/S using sucrose (5 minutes) is considerably less than with sodium gluconate.

Apart from the very clear advantages of much increased liquor C/S and high lime efficiency, this Example demonstrates the tolerance of the process to high liquor concentrations and variations in residence time. In combination, these factors contribute to improved stability of causticisation in the Bayer refinery. Furthermore, alumina losses caused by the formation of TCA are greatly reduced, which should contribute to improved refinery productivity.

Improved Causticisation Process (Example 5)

The application of the improved causticisation process in its preferred embodiment (as described in Example 5) was simulated in the laboratory by conducting a series of sequential batch reactions in a 3.75 litre Parr reactor. Each cycle of the series consisted of two steps: formation of the hydrocalumite at 80° C. in a pre-causticised liquor (the Primary causticisation reaction), and preparation of this pre-causticised liquor using the hydrocalumite so formed (the Secondary Causticisation reaction).

To initiate a series of cycles, several litres of first washer overflow liquor were first causticised with a slurry of industrial grade hydrated lime (90.3% available lime as $Ca(OH)_2$) using a conventional (prior art) causticisation process After filtration and disposal of the collected solids, this provided a precausticised liquor from which the initial sample of hydrocalumite could be produced.

Two litres of this liquor was placed in the 3.75 litre Parr reactor and the temperature raised to 80° C., maintained under thermostatic control. The required quantity of hydrated lime to achieve a target C/S of 0.950 (at 100% efficiency) was slurried with hot deionised water in a 500 mL polypropylene bottle, equilibrated at 80° C., then quantitatively transferred to the Parr autoclave to initiate the reaction. Agitation was applied using twin pitched-blade turbine impellers operating at 200 rpm. After allowing 30 minutes for the reaction to conclude, the entire contents of the reactor were filtered under vacuum using a Buchner funnel and filter flask. Residual solids and liquor remaining in the Parr reactor were washed into the filter funnel with hot deionised water. The filter cake was further washed with hot deionised water to remove entrained liquor (this procedure, while unnecessary in normal use, was required to facilitate calculation of the mass balance).

First washer overflow liquor (500 mL) was added to the reactor and heated to 80° C. A second Parr reactor of two litre capacity was filled with first washer overflow liquor (1.500 litres) and heated to 185° C. The damp hydrocalumite cake prepared in the previous step was added to the 500 mL of liquor in the first reactor. The reactor was immediately sealed and the agitator switched on to disperse the solids. After allowing approximately two minutes for dispersal of the solids and thermal equilibration, the contents of the second reactor were transferred under pressure to the first reactor. Upon mixing, the combined temperature of the liquor and slurry in the first reactor was 120° C. This temperature was maintained thereafter by thermostatic control. The mixture, still agitated at 200 rpm, was permitted to react for 2 minutes.

After reaction, a sample of the slurry was collected and immediately filtered through a 0.45 μm Supor filter membrane. The filtrate was analysed for A,C and S and total sodium content. Solids were thoroughly washed with deionised water on the filter. Damp cake was collected for examination by XRD. The remaining solids were dried under partial vacuum (104 mm Hg) at 105° C. and analysed for their elemental composition by XRF, and for their $CO_2$ content by acidification and measurement of the evolved gas.

The contents of the reactor were transferred to a pressure filter equipped with a 0.45 μm Supor filter. The filtrate was collected to be used to initiate the next cycle of the process. Some loss of liquor occurred due to sampling and transfer of the slurry Allowance was made for this in the subsequent cycle by adjusting the lime charge in the primary causticisation reaction, and by reducing the volume of first washer overflow liquor in the secondary causticisation reaction. This procedure was repeated until four full cycles of the process were completed.

Improved Causticisation Process (Example 5)—Effect of Inhibitor

The test procedure described above was repeated, with the addition of 1.0 g of sodium gluconate with the hydrocalumite to the 3.75 litre reactor at the start of the secondary causticisation reaction. This gave a final concentration of approximately 0.5 g/L in the combined liquor during the secondary causticisation reaction. To compensate for the retarding effect of the inhibitor, a residence time of 120 minutes was allowed for the secondary reaction.

Improved Causticisation Process (Example 5)—Maximum C/S

To demonstrate the ability of this process to achieve very high liquor causticity (C/S), the above procedure was repeated with a higher lime charge, calculated to achieve a target C/S of 1.00. The test procedure described above was repeated, with the addition of 1.0 g of sodium gluconate with the hydrocalumite to the 3.75 litre reactor at the start of the secondary causticisation reaction. This gave a final concentration of approximately 0.5 g/L in the combined liquor during the secondary causticisation reaction. To compensate for the retarding effect of the inhibitor, and to allow the reaction sufficient time to achieve the much higher C/S target, a residence time of 150 minutes was allowed for the secondary reaction.

Typical results from each of the Example 5 tests described above are summarised in Tables 7 and 8 below, showing the liquor and solids analyses respectively The results are compared with the Prior Art process test data for reference

TABLE 7

Typical liquor analyses at maximum C/S

| Sample | A (g/L) | C (g/L) | S (g/L) | A/C | C/S | TS (g/L) |
|---|---|---|---|---|---|---|
| Start liquor | 92.4 | 138.3 | 170.2 | 0.668 | 0.813 | 231.7 |
| Prior Art | 81.9 | 137.8 | 155.2 | 0.594 | 0.888 | 207.0 |
| Example 5 | 80.5 | 137.6 | 151.2 | 0.585 | 0.910 | 199.0 |
| Example 5 + inhibitor | 81.1 | 143.5 | 153.9 | 0.565 | 0.932 | 199.9 |
| Example 5 maximum C/S | 80.0 | 144.5 | 151.3 | 0.554 | 0.955 | 200.0 |

TABLE 8

Typical solids analyses at maximum C/S (% dry weight)

| Sample | CaO | $Al_2O_3$ | $CO_2$ | Other | Lime Efficiency |
|---|---|---|---|---|---|
| Prior Art | 50.6 | 9.2 | 20.6 | 19.6 | 54.3% |
| Example 5 | 51.8 | 6.6 | 25.4 | 16.2 | 65.4% |
| Example 5 + inhibitor | 52.6 | 2.8 | 35.9 | 8.7 | 91.1% |
| Example 5 maximum C/S | 52.2 | 3.8 | 33.1 | 10.9 | 84.6% |

It can be seen from the above results that the preferred embodiment of the process, as described in Example 5, offers significant advantages over the Prior Art process both in the achievable C/S and the efficiency of lime utilisation. In the above example, lime efficiency exceeded 91%. The preferred embodiment also offers advantages over that of Example 2. With no additive present, the lime utilisation efficiency is similar to that of Example 2, but achieves a much higher C/S ratio (0.910 versus 0.897). With inhibitor present, both improved lime efficiency (91.1% versus 96.9%) and higher C/S ratio (0.932 versus 0.924) are achieved. However, the most important advantage of the preferred embodiment over that described in Example 2 may be seen by referring to the results for the test in which maximum C/S was targeted. Using the preferred embodiment of the process, it is possible to achieve extremely high liquor causticity (C/S of 0.955 or better), still with markedly improved lime efficiency (better than 80%) over the prior art process Higher liquor causticity than this can be achieved, at the expense of progressively degraded lime efficiency.

From the preceding examples and the description of several possible implementations, it will be apparent that the improved process of causticisation disclosed herein has many significant advantages over causticisation technology as currently practised. These include:

[a] The lime utilisation efficiency is extremely high (over 90% is achievable), even with quite concentrated liquors.

[b] The achievable C/S ratio is substantially increased (in excess of 0.955), even with quite concentrated liquors, allowing higher plant caustic concentrations and improved productivity. Even higher C/S ratios are achievable at the expense of some loss of lime efficiency.

[c] A comparatively pure calcium carbonate waste product is produced, creating the potential to recycle lime via a small lime kiln, with further potential reductions in lime consumption.

[d] The loss of alumina due to the formation of unwanted calcium aluminate species is greatly reduced. The recovery of alumina from bauxite is improved, resulting in increased production.

[e] Causticisation is generally much faster, resulting in reduced tank volumes, and a more compact installation
[f] Performance is stable, despite variations in liquor composition and flows Reduced indirect carbon dioxide emissions due to improved refinery efficiency, and reduced lime wastage.
[g] Sample to implement at virtually any refinery.
[h] Reduced volume of residue due to minimal lime consumption—potential savings in residue disposal and storage costs.
[i] Potential to distribute the causticisation reaction piecewise over two or more of the refinery's liquor streams.
[j] Potential to implement multiple causticisation processes at various locations in the refinery.

Now that several embodiments of the invention have been described in detail, it will be apparent to persons skilled in the chemical engineering arts that numerous variations and modifications can be made without departing from the basic inventive concepts. All such modifications and variations are considered to be within the scope of the present invention, the nature of which is to be determined from the foregoing description and the appended claims Furthermore, the preceding examples are provided to illustrate specific embodiments of the invention and are not intended to limit the scope of the process of the invention.

The invention claimed is:

1. A process for the stabilization of a hydrocalumite species comprising the steps of:
adding a calcium containing species in a first Bayer liquor so as to form the hydrocalumite species; and
adding an inhibitor that stabilizes the hydrocalumite species thereby inhibiting the formation of TCA or other by-products in the first Bayer liquor.

2. A process as defined in claim 1, wherein the inhibitor is added to the first Bayer liquor according to at least one of: prior to the formation of the hydrocalumite species, during the formation of the hydrocalumite species, and after the formation of the hydrocalumite species.

3. A process as defined in claim 2 wherein the inhibitor is an anionic or non-ionic surfactant.

4. A process as defined in claim 3 wherein the anionic surfactant is selected from the group comprising anionic homopolymers or co-polymers, including polyacrylic acid and its co-polymers with acrylamide and polymers bearing hydroxamate function groups, hydroxamic acids, humic and tannic acids, lignosulphonates, fatty acids, sulphonated carboxylic acids, carboxylic acids, polyhydroxy carboxylic acids, combinations thereof of their salts or derivatives or combinations thereof.

5. A process as defined in claim 4 wherein the anionic surfactant is gluconic acid.

6. A process as defined in claim 4 wherein the anionic surfactant is a gluconate.

7. A process as defined in claim 6 wherein the gluconate is sodium gluconate.

8. A process as defined in claim 3 wherein the anionic surfactant is a sugar or a polysaccharide.

9. A process as defined in claim 8 wherein the sugar is sucrose or glucose.

10. A process as defined in clam 8 wherein the polysaccharide is starch.

11. A process as defined in claim 2 further comprising the step of heating the first Bayer liquor.

12. A process as defined in claim 11 wherein the step of heating is conducted prior to the step of forming the hydrocalumite species.

13. A process as defined in claim 12 further comprising the step of heating the first Bayer liquor to a temperature in the range of 25° C. to 100° C.

14. A process as defined in claim 13 wherein the Bayer liquor is heated in the temperature range of 70° C. to 80° C.

15. A process as defined in claim 11 wherein the step of heating occurs after the addition of the inhibitor.

16. A process as defined in claim 15 wherein the first Bayer liquor is heated in the temperature range of 100° C. to 180° C.

17. A process as defined in claim 16 wherein the first Bayer liquor is heated in the temperature range of 120° C. to 140° C.

18. A process as defined in claim 2 further comprising the step of agitating the first Bayer liquor.

19. A process as defined in claim 2 further comprising the step of removing the stabilised hydrocalumite species.

20. A process as defined in claim 19, wherein the step of removing the stabilised hydrocalumite species includes the step of filtering.

21. A process as defined in claim 20, wherein the step of filtering is conducted under a vacuum.

22. A process as defined in claim 19 further comprising the step of washing the removed hydrocalumite species.

23. A process as defined in claim 22, wherein the step of washing is conducted using deionised water.

24. A process as defined in claim 23, wherein the step of washing with deionised water is conducted using hot deionised water.

25. A process as defined in claim 19, further comprising the step of using at least a portion of the removed hydrocalumite to causticise a second Bayer liquor.

* * * * *